United States Patent
Miki

(10) Patent No.: US 11,081,697 B2
(45) Date of Patent: Aug. 3, 2021

(54) ELECTRODE ACTIVE MATERIAL, ALL SOLID FLUORIDE ION BATTERY, AND METHOD FOR PRODUCING ELECTRODE ACTIVE MATERIAL

(71) Applicant: TOYOTA JIDOSHA KABUSHIKI KAISHA, Toyota (JP)

(72) Inventor: Hidenori Miki, Hiratsuka (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 110 days.

(21) Appl. No.: 15/935,747

(22) Filed: Mar. 26, 2018

(65) Prior Publication Data

US 2018/0316012 A1     Nov. 1, 2018

(30) Foreign Application Priority Data

Apr. 27, 2017    (JP) .............................. JP2017-088217

(51) Int. Cl.
     *H01M 4/58*      (2010.01)
     *H01M 4/36*      (2006.01)
     (Continued)

(52) U.S. Cl.
     CPC ......... *H01M 4/582* (2013.01); *H01M 4/1315* (2013.01); *H01M 4/13915* (2013.01);
     (Continued)

(58) Field of Classification Search
     CPC ............... H01M 4/582; H01M 4/1315; H01M 4/13915; H01M 4/366; H01M 10/052;
     (Continued)

(56) References Cited

U.S. PATENT DOCUMENTS

| | | |
|---|---|---|
| 4,110,251 A | 8/1978 | Lauder et al. |
| 5,601,949 A | 2/1997 | Fujimoto et al. |
| | (Continued) | |

FOREIGN PATENT DOCUMENTS

| | | |
|---|---|---|
| JP | 2011-165392 A | 8/2011 |
| JP | 2013-145758 A | 7/2013 |
| | (Continued) | |

OTHER PUBLICATIONS

M. Anji Reddy, et al., Batteries based on fluoride shuttle, Nov. 21, 2011, Journal of Materials Chemistry, vol. 21, No. 43, p. 17059-17062 (Year: 2011).*

(Continued)

*Primary Examiner* — Kaity V Chandler
(74) *Attorney, Agent, or Firm* — Sughrue Mion, PLLC

(57) ABSTRACT

An object of the present disclosure relates to an electrode active material that has excellent discharge capacity and is used in an all solid fluoride ion battery. The present disclosure achieves the object by providing an electrode active material to be used in an all solid fluoride ion battery, the electrode active material comprising: an active material region that contains an active material component including a layered structure; and a coating region positioned in a surface side of the active material region; and a fluorine concentration in the coating region is higher than a fluorine concentration in the active material region.

13 Claims, 8 Drawing Sheets

(51) Int. Cl.
  H01M 10/0562 (2010.01)
  H01M 4/1315 (2010.01)
  H01M 4/13915 (2010.01)
  H01M 10/052 (2010.01)
  H01M 4/525 (2010.01)
  H01M 4/505 (2010.01)

(52) U.S. Cl.
  CPC ......... H01M 4/366 (2013.01); H01M 10/052 (2013.01); H01M 10/0562 (2013.01); H01M 4/505 (2013.01); H01M 4/525 (2013.01); H01M 2300/008 (2013.01)

(58) Field of Classification Search
  CPC .. H01M 10/0562; H01M 4/505; H01M 4/525; H01M 2300/008
  See application file for complete search history.

(56) References Cited

U.S. PATENT DOCUMENTS

| | | | | |
|---|---|---|---|---|
| 9,048,495 | B2* | 6/2015 | Sun | C01G 45/1221 |
| 10,090,511 | B2* | 10/2018 | Miki | H01M 4/505 |
| 10,312,510 | B2* | 6/2019 | Miki | H01M 10/05 |
| 10,811,677 | B2* | 10/2020 | Miki | H01M 4/131 |
| 2013/0013103 | A1 | 1/2013 | Shibata | |
| 2014/0272564 | A1* | 9/2014 | Holme | H01M 4/523 |
| | | | | 429/211 |
| 2016/0365577 | A1 | 12/2016 | Zhang et al. | |
| 2017/0237067 | A1 | 8/2017 | Miki et al. | |

FOREIGN PATENT DOCUMENTS

| | | | |
|---|---|---|---|
| JP | 2015-191797 | A | 11/2015 |
| JP | 2017-017010 | A | 1/2017 |
| JP | 2017-143044 | A | 8/2017 |
| WO | 2007/146453 | A2 | 12/2007 |
| WO | 2015/146265 | A1 | 10/2015 |

OTHER PUBLICATIONS

Yoshihiro Tsujimoto et al., Topotactic Synthesis and Crystal Structure of a Highly Fluorinated Ruddlesden-Popper-Type Iron Oxide, Aug. 1, 2011, American Chemical Society, 23, pp. 3652-3658 (Year: 2011).*

J. F. Mitchell et al., "Charge delocalization and structural response in layered $La_{1.2}Sr_{1.8}Mn_2O_7$: Enhanced distortion in the metallic regime", Phys. Rev. B, Published Jan. 1, 1997, pp. 63-66, vol. 55, No. 1.

Clemens et al., "Electrochemical fluorination of perovskite type $BaFeO_{2.5}$", Dalton Transactions, vol. 43, pp. 15771-15778, 2014 (8 pages total).

Sivakumar et at., "Topotactic route for new layered perovskite oxides containing fluorine: $Ln_{1.2}Sr_{1.8}Mn_2O_7$(Ln=Pr, Nd, Sm, Eu, and Gd)", Materials Research Bulletin, 2009, vol. 44, pp. 74-77 (5 pages).

Clemens et al., "Synthesis and characterization of the $La_{1-x}Sr_xFeO_{3-\delta}$ system and the fluorinated phases $La_{1-x}Sr_xFeO_{3-x}F_x$", Journal of Solid State Chemistry, 2011, vol. 184, pp. 2870-2876 (7 pages).

Office Action dated Oct. 5, 2018, issued by the U.S. Patent and Trademark Office in U.S. Appl. No. 15/392,272.

Notice of Allowance dated Jan. 24, 2019, issued by the U.S. Patent and Trademark Office in U.S. Appl. No. 15/392,272.

Office Action dated Oct. 19, 2018, issued by the U.S. Patent and Trademark Office in U.S. Appl. No. 15/821,992.

Sturza et al., "Fluorination of Iron Hexagonal Perovskites Promoting Low Temperature Oxygen Mobility", Chem. Mater., 2010, vol. 22, No. 24, pp. 6726-6735 (10 pages).

Office Action dated Nov. 25, 2019, issued by the U.S. Patent and Trademark Office in U.S. Appl. No. 15/821,992.

Cava, "Perovskite Structure and Derivatives", CAVA Lab, 2009, website: https://www.princeton.edu/-cavalab/tutorials/public/structures/perovskites.html, 6 pages.

Office Action dated Mar. 8, 2019, issued by the U.S. Patent and Trademark Office in U.S. Appl. No. 15/821,992.

Kida et al., "Oxygen Permeation Properties of Partially A-Site Substituted $BaFeO_{3-\delta}$ Perovskites", Journal of the Electrochemical Society, 2009, vol. 156, No. 12, E187-E191 (5 pages).

Office Action dated May 1, 2020, issued by the U.S. Patent and Trademark Office in U.S. Appl. No. 15/821,992.

Arroyo-De Dompablo et al., "In quest of cathode materials for Ca ion batteries: the $CaMO_3$ perovskites (M=Mo, Cr, Mn, Fe, Co, and Ni)", PCCP, 2016, vol. 18, pp. 19966-19972 (7 pages).

Notice of Allowance dated Aug. 17, 2020, issued by the U.S. Patent and Trademark Office in U.S. Appl. No. 15/821,992.

Notice of Allowance dated Jul. 9, 2018, issued by the U.S. Patent and Trademark Office in U.S. Appl. No. 15/611,205.

Hibino et al., "Oxygen rocking aqueous batteries utilizing reversible topotactic oxygen insertion/extraction in iron-based perovskite oxides $Ca1-xLaxFeO3-\delta$", Scientific Reports, 2012, vol. 2, No. 601, DOI: 10.1038/srep00601, pp. 1-4 (4 pages).

* cited by examiner

250nm

250nm

100nm

5nm

2nm

FIG. 10A HAADF-STEM 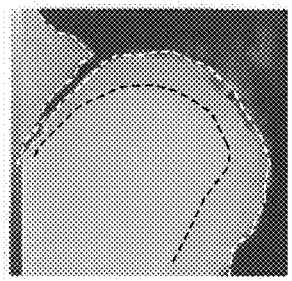
250nm
FIG. 10B La-L 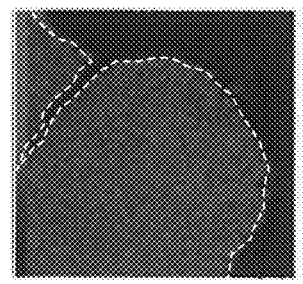
250nm
FIG. 10C O-K 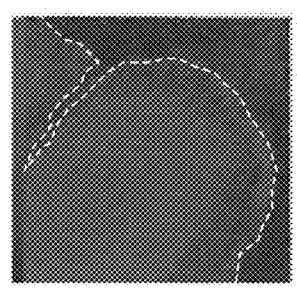
250nm
FIG. 10D O-K 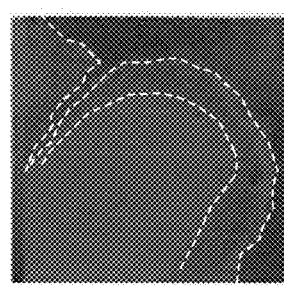
250nm
FIG. 10E F-K 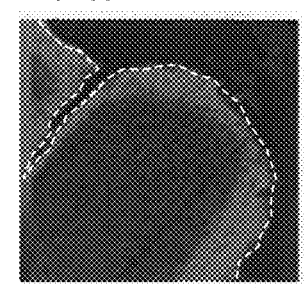
250nm
FIG. 10F F-K 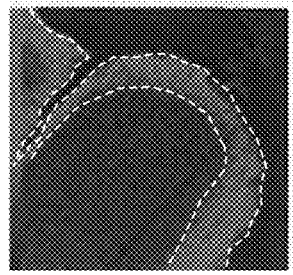
250nm
FIG. 10G Mn-K 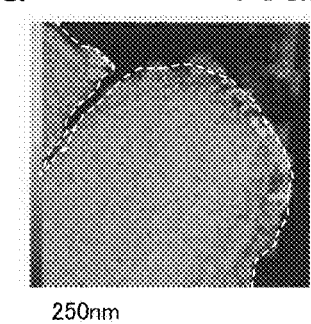
250nm
FIG. 10H Sr-K 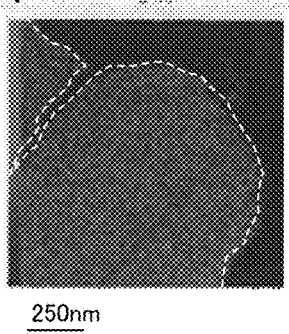
250nm Sample : Cubic-SrF2
[1-10] incidence
Fm-3m(225) a=0.57996nm
PDF#001-4244

ELECTRODE ACTIVE MATERIAL, ALL SOLID FLUORIDE ION BATTERY, AND METHOD FOR PRODUCING ELECTRODE ACTIVE MATERIAL

TECHNICAL FIELD

The present disclosure relates to an electrode active material that has excellent discharge capacity and is used in an all solid fluoride ion battery.

BACKGROUND ART

As high-voltage and high-energy density batteries, for example, Li ion batteries are known. The Li ion battery is a cation-based battery utilizing Li ions as the carrier. Meanwhile, as anion-based batteries, fluoride ion batteries utilizing fluoride ions as the carrier are known.

For example, Patent Literature 1 discloses a liquid electrolyte for a fluoride ion battery, the liquid electrolyte comprising: a fluoride salt, and a solvent that solves the fluoride salt; wherein the solvent is an aromatic material including an aromatic cation and an anion; and a molar ratio of the aromatic cation to the fluoride ion is more than 1. Also, a metal active material such as Cu is exemplified as an active material. The object of this technology is to provide a liquid electrolyte for a fluoride ion battery which allows a larger capacity of the battery.

Incidentally, although it is not a technology related to a fluoride ion battery, Patent Literature 2 discloses a technology to utilize a Perovskite-type transition metal fluoride such as $NaFeF_3$ in the cathode of a sodium ion battery. Also, Patent Literature 3 discloses a cathode active material having a fluorine-based Perovskite structure represented by $MF_3$ (M is one of Mn, Co, and Ni), and an alkali metal ion battery utilizing thereof. Similarly, although it is not a technology related to a fluoride ion battery, Non-Patent Literature 1 discloses $La_{1.2}Sr_{1.8}Mn_2O_7$ as a compound having a Ruddlesden-Popper structure.

CITATION LIST

Patent Literature

Patent Literature 1: Japanese Patent Application Laid-Open (JP-A) No. 2015-191797
Patent Literature 2: JP-A No. 2017-017010
Patent Literature 3: JP-A No. 2011-165392

Non-Patent Literature

Non-Patent Literature 1: J. F. Mitchell et al., "Charge delocalization and structural response in layered La1.2Sr1.8Mn2O7: Enhanced distortion in the metallic regime", Phys. Rev. B 55, 63—Published 1 Jan. 1997

SUMMARY OF DISCLOSURE

Technical Problem

As an active material for a fluoride ion battery, a metal active material such as Cu has been known; however, when a metal active material is used, charge and discharge proceed along with fluorination and defluorination reactions of the metal, which causes a large volume change upon charge and discharge and results in degrading cycle properties. To solve the problem, the inventor of the present disclosure has researched on utilizing an active material having a layered structure. The charge and discharge of the active material having a layered structure proceed along with intercalation and desorption reactions, so that the volume change upon charge and discharge is small, and thus the cycle properties are presumably improved.

Meanwhile, the active material having a layered structure has low discharge capacity when it is used in an all solid fluoride ion battery.

The present disclosure has been made in view of the above circumstances, and a main object thereof is to provide an electrode active material that has excellent discharge capacity and is used in an all solid fluoride ion battery.

Solution to Problem

The present disclosure provides an electrode active material to be used in an all solid fluoride ion battery, the electrode active material comprising: an active material region that contains an active material component including a layered structure; and a coating region positioned in a surface side of the active material region; and a fluorine concentration in the coating region is higher than a fluorine concentration in the active material region.

According to the present disclosure, inclusion of the coating region having a high fluorine concentration allows an electrode active material to have excellent discharge capacity.

In the disclosure, it is preferable that the active material component includes a layered Perovskite structure and a crystal phase represented by $A_{n+1}B_nO_{3n+1-\alpha}F_x$, in which A includes at least one of an alkali earth metal element and a rare earth element, B includes at least one of Mn, Co, Ti, Cr, Fe, Cu, Zn, V, Ni, Zr, Nb, Mo, Ru, Pd, W, Re, Bi, and Sb, n is 1 or 2, $\alpha$ satisfies $0 \leq \alpha \leq 2$, and x satisfies $0 \leq x \leq 2.2$. The reason therefor is to improve the cycle properties.

The present disclosure provides an all solid fluoride ion battery comprising: a cathode active material layer containing a cathode active material, an anode active material layer containing an anode active material, and a solid electrolyte layer formed between the cathode active material layer and the anode active material layer; wherein the cathode active material or the anode active material is the above described electrode active material.

According to the present disclosure, inclusion of the above described electrode active material allows an all solid fluoride ion battery to have excellent discharge capacity.

The present disclosure provides a method for producing the above described electrode active material, the method comprising: a fluorination treatment step in which an active material precursor including a layered structure is prepared, and the active material precursor is subjected to a fluorination treatment to form the active material region and the coating region.

According to the present disclosure, the method comprises a fluorination treatment step so as to obtain an electrode active material having excellent discharge capacity.

Advantageous Effects of Disclosure

The electrode active material of the present disclosure exhibits effects such that it may be used in an all solid fluoride ion battery, and exhibit excellent discharge capacity.

BRIEF DESCRIPTION OF DRAWINGS

FIGS. 7A to 7G are the results of HAADF-STEM measurement for the electrode active material in Example.

FIGS. 10A to 10H are the results of TEM-EDX measurement for the electrode active material in Example.

DESCRIPTION OF EMBODIMENTS

The electrode active material, the all solid fluoride ion battery, and the method for producing the electrode active material of the present disclosure are hereinafter described.

A. Electrode Active Material

Figure 1A:
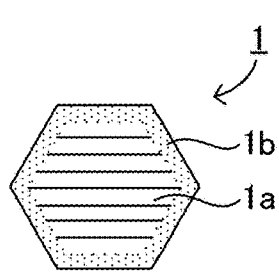
FIGS. 1A and 1B are schematic cross-sectional views illustrating an example of the electrode active material of the present disclosure.
Figure 1B:
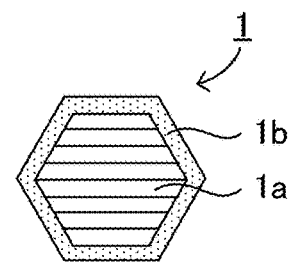

The electrode active material of the present disclosure is described with reference to drawings. FIGS. 1A and 1B are schematic cross-sectional views illustrating an example of the electrode active material of the present disclosure. Electrode active material 1 illustrated in FIGS. 1A and 1B each comprises active material region 1a that contains an active material component including a layered structure, and coating region 1b positioned in a surface side of active material region 1a, and a fluorine concentration in coating region 1b is higher than a fluorine concentration in active material region 1a. Also, electrode active material 1 is used in an all solid fluoride ion battery. FIG. 1A illustrates an example in which the crystallinity of coating region 1b and active material region 1a is continuous, and FIG. 1B illustrates an example in which the crystallinity of coating region 1b and active material region 1a is discontinuous.

According to the present disclosure, inclusion of the coating region having a high fluorine concentration allows an electrode active material to have excellent discharge capacity.

Here, an active material having a layered structure has low discharge capacity when it is used in an all solid fluoride ion battery. The reason therefor is presumed as follows.

Figure 2A:
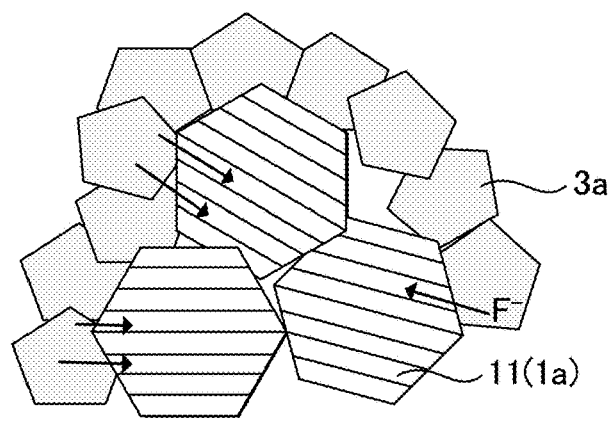
FIGS. 2A and 2B are explanatory diagrams explaining the presumed mechanism of the present disclosure.

The active material having a layered structure exhibits its function as an active material upon intercalation and desorption of fluoride ions into/from the layer. In the active material having a layered structure, fluoride ions are two-dimensionally spread. In an all solid fluoride ion battery, as shown in FIG. 2A, the place (slot) where intercalation and desorption of fluoride ion $F^-$ is possible in active material having a layered structure 11 (1a) is presumably limited mainly to the part where the layer is exposed. Thus, it is presumed that the intercalation and desorption of fluoride ion $F^-$ into/from active material 11 are limited.

On the other hand, the reason of the excellent discharge capacity in the electrode active material of the present disclosure is presumed as follows.

Figure 2B:
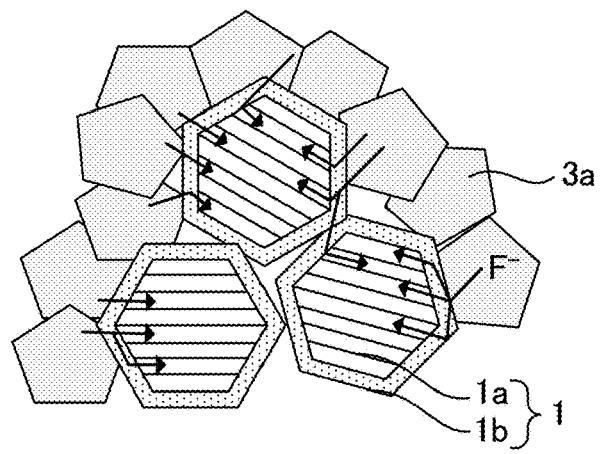

As shown in FIG. 2B, electrode active material 1 of the present disclosure comprises coating region 1b having a high fluorine concentration in a surface side of active material region 1a that contains an active material component including a layered structure. In coating region 1b, fluoride ion $F^-$ can be spread, so that the limited slot for fluoride ion $F^-$ in the active material component is presumably effectively used; thus, intercalation and desorption of fluoride ions into/from active material component are facilitated, which presumably results in the improvement of discharge capacity. Incidentally, FIGS. 2A and 2B illustrate examples in which fluoride ion $F^-$ is intercalated from solid electrolyte 3a to electrode active material 1.

Also, in the present disclosure, inclusion of the coating region allows an electrode active material to have excellent discharge capacity even when the current value upon charge and discharge is high (when the rate is high).

The electrode active material of the present disclosure comprises an active material region that contains an active material component including a layered structure, and a coating region positioned in a surface side of the active material region.

"The electrode active material comprises a coating region positioned in a surface side of the active material region" means that the electrode active material comprises, in a cross-section observation image of the electrode active material by HAADF-STEM (High-Angle Annular Dark Field Scanning TEM), two regions: a first region, and a second region that is adjacent to the first region and is positioned toward outside in the first region. The two regions may be observed as the regions having a different contrast to each other. In the cross-section observation image, usually, the first region corresponds to the active material region, and the second region corresponds to the coating region.

Also, "positioned in a surface side of the active material region" means that, in the cross-section observation image, the second region corresponding to the coating region is present in the direction toward outside from the viewpoint of the center of the first region corresponding to the active material region.

The electrode active material of the present disclosure is hereinafter described in each constitution.

1. Coating Region

The coating region in the present disclosure is positioned in a surface side of the active material region. Also, a fluorine concentration in the coating region is higher than a fluorine concentration in the active material region.

The coating region is positioned in a surface side of the active material region; for example, the crystallinity of the coating region and the active material region may be continuous. Also, for example, the crystallinity of the coating region and the active material region may be discontinuous.

"The crystallinity of the coating region and the active material region is continuous" means that, when the border of the first region and the second region in the cross-section observation image by HAADF-STEM measurement is observed in a higher magnification (such as 50 magnifications), no clear border (interface) between the two regions is present. Also, if the coating region and the active material region are continuous, the coating region may be considered as a coating portion.

On the other hand, "the crystallinity of the coating region and the active material region is discontinuous" means that, when the border of the first region and the second region in the cross-section observation image is observed in a higher magnification, clear border (interface) between the two regions is present. If the coating region and the active material region are discontinuous, the coating region may be considered as a coating layer. The coating layer may be a single layer, and may be a plurality of layers.

In the present disclosure, it is more preferable that the crystallinity of the coating region and the active material region is continuous. If the crystallinity of the coating region and the active material region is continuous, the cycle properties (the capacity maintenance rate upon the cycle) may be improved. The reason therefor is presumed that the adhesion of the coating region to the active material region is improved to facilitate tracking the coating region upon the volume change of the active material region due to intercalation and desorption reactions, and thereby the peel-off and slippage of the coating region are inhibited.

The crystallinity of the coating region may be uniform in the border side and in the outer side, and may be different.

In the present disclosure, for example, the crystallinity in the coating region of the outer side is preferably lower than that of the border side. Whether the crystallinity in the coating region of the outer side is low or not may be confirmed by, for example, an observation image by HAADF-STEM. In the observation image by HAADF-STEM, it is likely that a region having uniform contrast (fine observation image) has high crystallinity, and on the other hand, a region having ununiform contrast (rough observation image) has low crystallinity.

A fluorine concentration in the coating region is higher than a fluorine concentration in the active material region.

"A fluorine concentration in the coating region is higher than a fluorine concentration in the active material region" means, when the active material region contains fluorine, that a fluorine concentration (atomic %) in the coating region is higher than a fluorine concentration (atomic %) in the active material region, and it also includes, when the active material region does not contain fluorine, but the coating region contains fluorine.

When a fluorine concentration (atomic %) in the active material region is regarded as F1, and a fluorine concentration (atomic %) in the coating region is regarded as F2, the rate (F2/F1), F2 with respect to F1, is for example, 1.5 times or more, may be 2 times or more, and may be 2.5 times or more. Also, the rate (F2/F1), F2 with respect to F1, may be for example, 4 times or less, and may be 3 times or less.

The fluorine concentration in the coating region and the active material region may be, for example, measured by TEM-EDX (Energy-Dispersive X-ray spectroscopy).

Also, the fluorine concentration in the coating region is, in the cross-section observation image by HAADF-STEM, the fluorine concentration in the place positioned in the half of the distance from the border between the active material region and the coating region in the HAADF-STEM image (border between the first region and the second region) to the outermost region of the coating region (shortest distance). Also, the fluorine concentration in the active material region is the fluorine concentration in the place positioned in 250 nm to the center from the border between the active material region and the coating region in a HAADF-STEM image in a low magnification.

A specific fluorine concentration in the coating region may be, for example, 25 atomic % or more, and may be 30 atomic % or more. Also, the fluorine concentration in the coating region may be, for example, 40 atomic % or less, and may be 35 atomic % or less.

The coating region includes a coating component. The coating component may, for example, have the same crystal structure as that of the active material component. Also, the coating component may have an amorphous structure, and may have a microcrystal. Also, the coating component may, for example, have at least a fluorite structure.

Also, the coating component may, for example, include a constitutional metal element included in the active material region (an alkali earth metal in particular), as a counter cation. In particular, the coating component may have a fluorite structure, a microcrystal, or an amorphous structure that includes a constitutional metal element included in the active material region (an alkali earth metal in particular), as a counter cation.

Whether the coating component in the coating region has a fluorite structure or not may be confirmed by electron beam diffraction for example.

The coating region may be, for example, as shown in the later described section "C. Method for producing electrode active material", formed by a fluorination treatment to the active material precursor. Meanwhile, the coating region may be, for example, formed by coating the active material precursor with the coating material of which fluorine concentration is higher than that of the active material precursor. In this case, the coating region is formed as a coating layer.

Examples of the coating material may include $LaF_3$, $BaF_2$, $CaF_2$, $CeF_3$, $SrF_2$, KF, CsF, or a material synthesized by dissolving two kinds or more of the above described materials (a solid solution of two kinds or more of the above described materials).

The thickness of the coating region may be, for example, 1 μm or less, may be 300 nm or less, and may be 100 nm or less. Also, the thickness of the coating region may be, for example, 30 nm or more, and may be 50 nm or more.

The thickness of the coating region may be determined by, for example, in the observation image by HAADF-STEM, measuring the distance from the border between the active material region and the coating region to the outer surface of the coating region. The thickness of the coating region is the average value (n≥10).

Also, the coverage of the coating region with respect to the active material region may be, for example, 70% or more, may be 80% or more, and may be 90% or more. Also, the coverage of the coating region may be 100%.

2. Active Material Region

The active material region in the present disclosure contains an active material component including a layered structure. The active material component usually exhibits its function as an active material upon intercalation and desorption reactions of fluoride ions.

The crystal structure included in the active material component is not limited if the structure is a layered structure that causes intercalation and desorption reactions. Examples thereof may include a layered Perovskite structure. Incidentally, in the present disclosure, the crystal structure is not limited to the layered Perovskite structure. It is presumed that the above described presumed mechanism (mechanism explained in FIGS. 2A and 2B) works in the same manner even with a different layered structure.

In the present disclosure, among them, the active material component preferably includes the layered Perovskite structure. Also, it is more preferable that the active material component includes a layered Perovskite structure and a crystal phase represented by $A_{n+1}B_nO_{3n+1-\alpha}F_x$, in which A includes at least one of an alkali earth metal element and a rare earth element, B includes at least one of Mn, Co, Ti, Cr, Fe, Cu, Zn, V, Ni, Zr, Nb, Mo, Ru, Pd, W, Re, Bi, and Sb, n is 1 or 2, a satisfies 0≤α≤2, and x satisfies 0≤x≤2.2. The reason therefor is to improve the cycle properties.

The crystal phase is usually a crystal phase of a Ruddlesden-Popper structure or of the structure similar thereto. The crystal phase may be determined by, for example, an X-ray diffraction measurement (XRD measurement). Also, as described later, the easiness of intercalation and desorption correlates to a crystal structure; thus, if an active material includes a layered Perovskite structure and a crystal phase having the specific composition, excellent cycle properties may be obtained regardless of the element included in the crystal structure.

The crystal phase is represented by $A_{n+1}B_nO_{3n+1-\alpha}F_x$, in which A includes at least one of an alkali earth metal element and a rare earth element, B includes at least one of Mn, Co, Ti, Cr, Fe, Cu, Zn, V, Ni, Zr, Nb, Mo, Ru, Pd, W, Re, Bi, and Sb, n is 1 or 2, α satisfies 0≤α≤2, and x satisfies 0≤x≤2.2.

The A corresponds to A site in a layered Perovskite structure, and includes at least one of an alkali earth metal element and a rare earth element. The total proportion of the alkali earth metal element and the rare earth element in entire A site is, preferably 50% or more, more preferably 70% or more, and further preferably 90% or more. Also, the A may be only an alkali earth metal element, may be only a rare earth element, and may be an alkali earth metal element and a rare earth element. Also, the alkali earth metal element may be one kind, and may be two kinds or more. In the same manner, the rare earth element may be one kind, and may be two kinds or more.

Examples of the alkali earth metal element may include Be, Mg, Ca, Sr, Ba, and Ra. On the other hand, examples of the rare earth element may include Sc, Y, and Ln (Ln is a lanthanoid element). The A is preferably at least one of Ca, Sr, Ba, Sc, Y, La, Ce, Pr, Nd, Sm, and Gd. Also, the A may contain at least Sr. Also, the A may be Sr and La. The proportion of Sr in the A may be, for example, 30 mol % or more, and may be 50 mol % or more.

The B corresponds to B site in a layered Perovskite structure, and includes at least one of Mn, Co, Ti, Cr, Fe, Cu, Zn, V, Ni, Zr, Nb, Mo, Ru, Pd, W, Re, Bi, and Sb. Incidentally, Mn, Co, Ti, Cr, Fe, Cu, V, Ni, Zr, Nb, Mo, Ru, Pd, W, and Re correspond to a transition metal element. The proportion of the transition metal element in entire B site is, preferably 50% or more, more preferably 70% or more, and further preferably 90% or more. Also, the B may be only the transition metal element. Also, the transition metal element may be one kind, and may be two kinds or more. Also, the B may be at least one of Mn, Co, and Cu.

In the crystal phase, n is 1 or 2. Also, in the crystal phase, α satisfies 0≤α≤2; α may be 0, and may be larger than 0. Also, α may be 1 or less. Also, in the crystal phase, x satisfies 0≤x≤2.2; x may be 0, and may be larger than 0. Also, x may be 2 or less, and may be 1 or less.

The peak position of the crystal phase in XRD when n=1 differs from that of when n=2. In the same manner, the peak position of the crystal phase in XRD when x=0 differs from that of when x>0. For example, when n=1 and x=0, the crystal phase preferably has the peak at a position of 2θ=31.2°±0.5°, 33.3°±0.5°, 34.3°±0.5°, 42.7°±0.5°, 45.0°±0.5°, 46.5°±0.5°, 56.0°±0.5°, and 58.3°±0.5° in an XRD measurement using a CuKα ray. Incidentally, these peak positions are the peak positions based on the result of the later described $Sr_2CuO_3$, and the range of ±0.5° is set so as to determine the crystal phase similar to that of $Sr_2CuO_3$. Also, the range of the peak position may be ±0.3°, and may be ±0.1°. Regarding this point, the same applies hereafter.

Also, for example, when n=1 and x>0, the crystal phase preferably has the peak at a position of 2θ=30.5°±0.5°, 32.3°±0.5°, 33.0°±0.5°, 40.8°±0.5°, and 47.0°±0.5° in an XRD measurement using a CuKα ray. Incidentally, these peak positions are the peak positions based on the result of the later described $Sr_2CuO_2F_{2+\delta}$, and the range of ±0.5° is set so as to determine the crystal phase similar to that of $Sr_2CuO_2F_{2+\delta}$.

Also, for example, when n=2 and x=0, the crystal phase preferably has the peak at a position of 2θ=23.4°±0.5°, 26.6°±0.5°, 32.1°±0.5°, 32.7°±0.5°, 42.7°±0.5°, 46.9°±0.5°, and 57.9°±0.5° in an XRD measurement using a CuKα ray. Incidentally, these peak positions are the peak positions based on the result of the later described $La_{1.2}Sr_{1.8}Mn_2O_7$, and the range of ±0.5° is set so as to determine the crystal phase similar to that of $La_{1.2}Sr_{1.8}Mn_2O_7$.

Also, for example, when n=2 and x>0, the crystal phase preferably has the peak at a position of 2θ=22.8°±0.5°, 23.8°±0.5°, 30.5°±0.5°, 33.6°±0.5°, 41.0°±0.5°, 48.2°±0.5°, and 58.0°±0.5° in an XRD measurement using a CuKα ray. Incidentally, these peak positions are the peak positions based on the result of the later described $La_{1.2}Sr_{1.8}Mn_2O_7F_2$, and the range of ±0.5° is set so as to determine the crystal phase similar to that of $La_{1.2}Sr_{1.8}Mn_2O_7F_2$.

The active material component in the present disclosure preferably includes the crystal phase mainly. In particular, the proportion of the crystal phase with respect to all the crystal phases included in the active material is, preferably 50 mol % or more, more preferably 70 mol % or more, and further preferably 90 mol % or more.

The composition of the active material component is preferably the composition that allows the crystal phase to be obtained. Here, when n=1, the crystal phase is represented by $A_2B_1O_{4-\alpha}F_x$. The composition of an active material that includes this crystal phase is expressed by $A_aB_bO_cF_dX_e$. Incidentally, X is an element other than A, B, O, and F.

For example, "a" is 1.5 or more, may be 1.7 or more, and may be 1.9 or more. Also, for example, "a" is 2.5 or less, may be 2.3 or less, and may be 2.1 or less. For example, "b" is 0.5 or more, may be 0.7 or more, and may be 0.9 or more. Also, for example, "b" is 1.5 or less, may be 1.3 or less, and may be 1.1 or less. For example, "c" is 1.5 or more, may be 1.7 or more, and may be 1.9 or more. Also, for example, "c" is 5 or less, and may be 4.5 or less.

"d" may be 0, and may be larger than 0. Also, for example, "d" is 2.5 or less. "e" may be 0, and may be larger than 0. Also, for example, "e" is 3 or less, may be 2 or less, and may be 1 or less.

Meanwhile, when n=2, the above described crystal phase is represented by $A_3B_2O_{7-\alpha}F_x$. The composition of an active material that includes this crystal phase is regarded as $A_fB_gO_hF_iX_j$. Incidentally, X is an element other than A, B, O, and F.

For example, "f" is 2.5 or more, may be 2.7 or more, and may be 2.9 or more. Also, for example, "f" is 3.5 or less, may be 3.3 or less, and may be 3.1 or less. For example, "g" is 1.5 or more, may be 1.7 or more, and may be 1.9 or more. Also, for example, "g" is 2.5 or less, may be 2.3 or less, and may be 2.1 or less. For example, "h" is 4.5 or more, may be 4.7 or more, and may be 4.9 or more. Also, for example, "h" is 8 or less, and may be 7.5 or less.

"i" may be 0, and may be larger than 0. Also, for example, "i" is 2.5 or less. "j" may be 0, and may be larger than 0. Also, for example, "j" is 3 or less, may be 2 or less, and may be 1 or less.

The shape of the active material region is not limited, and example thereof may include a granular shape. The average particle size ($D_{50}$) of the active material region is, for example, in a range of 0.1 μm to 50 μm, and preferably in a range of 1 μm to 20 μm. The average particle size ($D_{50}$) of the active material region may be determined by, for example, the result of a particle distribution measurement using a laser diffraction scattering method.

3. Others

The electrode active material of the present disclosure comprises the above described active material region and coating region. The electrode active material of the present disclosure may be produced by, for example, the method later described in the section "C. Method for producing electrode active material". Also, the electrode active material of the present disclosure may be produced by, for example, coating an active material precursor with a coating material of which fluorine concentration is higher than that of the active material precursor.

The electrode active material of the present disclosure is usually used as a cathode active material or an anode active material in an all solid fluoride ion battery.

B. All Solid Fluoride Ion Battery

Figure 3:
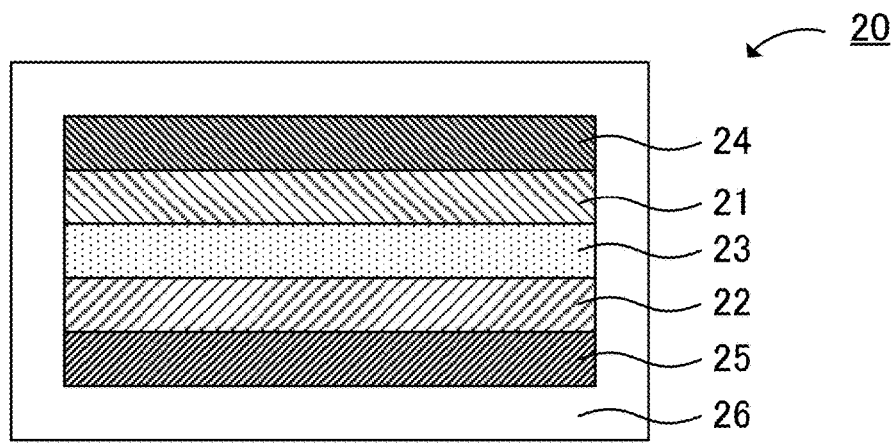
FIG. 3 is a schematic cross-sectional view illustrating an example of the all solid fluoride ion battery of the present disclosure.

FIG. 3 is a schematic cross-sectional view illustrating an example of an all solid fluoride ion battery of the present disclosure. All solid fluoride ion battery 20 shown in FIG. 3 comprises cathode active material layer 21 containing a cathode active material, anode active material layer 22 containing an anode active material, solid electrolyte layer 23 formed between cathode active material layer 21 and anode active material layer 22, cathode current collector 24 for collecting currents of cathode active material layer 21, anode current collector 25 for collecting currents of anode active material layer 22, and battery case 26 for storing these members. The present disclosure features the configuration in which the above described electrode active material is used as the cathode active material or the anode active material.

According to the present disclosure, inclusion of the above described electrode active material allows an all solid fluoride ion battery to have excellent discharge capacity.

The all solid fluoride ion battery of the present disclosure is hereinafter described in each constitution.

1. Cathode Active Material Layer

The cathode active material layer in the present disclosure is a layer that contains at least a cathode active material. Also, the cathode active material layer may further contain at least one of a conductive material and a binder other than the cathode active material. Also, the cathode active material layer may further contain a solid electrolyte.

In the present disclosure, the above described active material may be used as the cathode active material. Meanwhile, if the above described active material is used as the anode active material, an arbitrary active material having a higher potential than that of the anode active material may be used as the cathode active material.

The conductive material is not limited if it has desired electron conductivity, and examples thereof may include carbon materials. Examples of the carbon material may include, carbon black such as acetylene black, Ketjen black, furnace black, and thermal black; graphene; fullerene; and carbon nanotube. Meanwhile, the binder is not limited if it is chemically and electronically stable, and examples thereof may include fluorine-based binders such as polyvinylidene fluoride (PVDF) and polytetra fluoroethylene (PTFE).

Also, the content of the cathode active material in the cathode active material layer is preferably larger from the viewpoint of the capacity; for example, the content is 30 weight % or more, preferably 50 weight % or more, and more preferably 70 weight % or more. Also, the thickness of the cathode active material layer greatly varies with the constitution of the battery, and thus is not limited.

2. Anode Active Material Layer

The anode active material layer in the present disclosure is a layer that contains at least an anode active material. Also, the anode active material layer may further contain at least one of a conductive material and a binder other than the anode active material.

In the present disclosure, the above described active material may be used as the anode active material. Meanwhile, if the above described active material is used as the cathode active material, an arbitrary active material having a lower potential than that of the cathode active material may be used as the anode active material.

Regarding the conductive material and the binder, the same materials described in "1. Cathode active material layer" above may be used. Also, the content of the anode active material in the anode active material layer is preferably larger from the viewpoint of the capacity; for example, the content is 30 weight % or more, preferably 50 weight % or more, and more preferably 70 weight % or more. Also, the thickness of the anode active material layer greatly varies with the constitution of the battery, and thus is not limited.

3. Solid Electrolyte Layer

The solid electrolyte layer in the present disclosure is a layer formed between the cathode active material layer and the anode active material layer. The solid electrolyte layer is a layer that contains at least a solid electrolyte.

Examples of the solid electrolyte may include a fluoride of a lanthanoid element such as La and Ce, a fluoride of an alkali element such as Li, Na, K, Rb, and Cs, and a fluoride of an alkali earth element such as Ca, Sr, and Ba. Particular examples may include a fluoride of La and Ba (such as $La_{0.9}Ba_{0.1}F_{2.9}$) and a fluoride of Pb and Sn.

Also, the thickness of the solid electrolyte layer in the present disclosure greatly varies with the constitution of the battery, and thus is not limited.

4. Other Constitutions

The all solid fluoride ion battery of the present disclosure comprises at least the above described anode active material layer, cathode active material layer, and solid electrolyte layer. The battery usually further comprises a cathode current collector for collecting currents of the cathode active material layer, and an anode current collector for collecting currents of the anode active material layer. Examples of the shape of the current collectors may include a foil shape, a mesh shape, and a porous shape.

5. All Solid Fluoride Ion Battery

The all solid fluoride ion battery of the present disclosure may be a primary battery and may be a secondary batter, but preferably a secondary battery among them, so as to be repeatedly charged and discharged and useful as a car-mounted battery for example. Incidentally, the primary battery includes a use of the secondary battery as a primary battery (for only the purpose to discharge just once after charge). Also, examples of the shape of the all solid fluoride ion battery of the present disclosure may include a coin shape, a laminate shape, a cylindrical shape, and a square shape.

C. Method for Producing Electrode Active Material

Figure 4A:
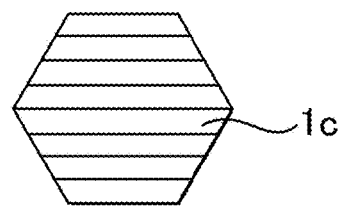
FIGS. 4A and 4B are process diagrams illustrating an example of the method for producing the electrode active material of the present disclosure.
Figure 4B:
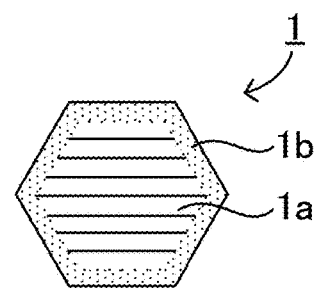

FIGS. 4A and 4B are process diagrams illustrating an example of the method for producing the electrode active material of the present disclosure. The method for producing the electrode active material of the present disclosure comprises, as shown in FIGS. 4A and 4B, a fluorination treatment step in which active material precursor $1c$ including a layered structure is prepared, and the active material precursor $1c$ is subjected to a fluorination treatment to form electrode active material 1 including active material region $1a$ and coating region $1b$.

According to the present disclosure, the method comprises the fluorination treatment step, so as to obtain an electrode active material with excellent discharge capacity.

In the fluorination treatment step, the coating region may be formed in the process of fluorinating the active material precursor, so that the crystallinity of the coating region and the active material region may be continuous in the electrode active material.

The fluorination treatment step in the present disclosure is explained.

The active material precursor to be prepared in the fluorination treatment step usually includes the same layered structure as that of the active material component explained in the section "A. Electrode active material" above. The active material precursor may be prepared by synthesizing thereof, and a commercially available active material precursor may be prepared as is. Example of the method for synthesizing the active material precursor may include a solid reaction method. In the solid reaction method, for example, a raw material composition containing the constitutional element of the active material is heat treated to cause solid phase reaction, and thereby the active material is synthesized. For example, when the active material precursor has a crystal phase represented by $A_{n+1}B_nO_{3n+1-\alpha}F_x$ explained in the section "A. Electrode active material", the active material precursor may be synthesized by heat treating the raw material composition containing an A element, a B element, and an O element so as to cause a solid phase reaction. In the method for synthesizing the active material precursor, the material after the solid phase reaction may be fluorinated.

The method for the fluorination treatment is not limited if the treatment allows the active material region and the coating region to be formed. Examples of the method for the fluorination treatment may include a method in which the active material precursor and a fluorine source are heat treated. An example of the fluorine source may be polyvinylidene fluoride (PVDF). Time and temperature for the fluorination treatment may be appropriately set in accordance with the kind of the active material precursor and the fluorine source. The temperature for the fluorination treatment may be, for example, in a range of 350° C. to 500° C. Also, the time for the fluorination treatment may be, for example, in a range of 10 hours to 20 hours.

In the present disclosure, the fluorination treatment is preferably conducted a plurality of times. If the fluorination treatment is conducted a plurality of times, it may be twice to five times for example.

In the fluorination treatment step, the active material region and the coating region may be formed by the fluorination treatment in which a fluorine concentration in the surface side of the active material precursor is set higher than that in the center side of the active material precursor.

The electrode active material to be obtained in the method for producing the electrode active material of the present disclosure is described in the section "A. Electrode active material" above; thus, the description herein is omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is described in more details with reference to Examples.

Example

Synthesis of $La_{1.2}Sr_{1.8}Mn_2O_7$ $La_2O_3$ of 1.9403 g, $SrCO_3$ of 2.6372 g, and $Mn_2O_3$ of 1.5679 g were weighed and mixed by an agate mortar to obtain the mixture. The obtained mixture was projected into a boat made of alumina and burned at 1400° C. using a tube furnace. The conditions for burning were to raise temperature to 1400° C. taking 140 minutes, and to keep 1400° C. for 20 hours. After that, the mixture was cooled down to a room temperature, and crushed and mixed by an agate mortar. The crushed and mixed test sample was burned again in the same conditions. After that, the test sample was cooled down to a room temperature, and crushed and mixed by an agate mortar. Thereby, $La_{1.2}Sr_{1.8}Mn_2O_7$ was obtained.

Fluorination treatment of $La_{1.2}Sr_{1.8}Mn_2O_7$

A fluorination treatment was conducted using PVDF (polyvinylidene fluoride) as the fluorine source.

The obtained $La_{1.2}Sr_{1.8}Mn_2O_7$ and PVDF (polyvinylidene fluoride) were respectively projected into a separate boat, and placed in a same furnace. After that, the temperature was raised to 400° C. taking 40 minutes, 400° C. was kept for 12 hours, and then naturally cooled down. Thereby, an active material precursor ($La_{1.2}Sr_{1.8}Mn_2O_7F_2$) was obtained.

Fluorination Treatment of $La_{1.2}Sr_{1.8}Mn_2O_7F_2$

A fluorination treatment, in which PVDF was used and 400° C. was kept for 12 hours, was further conducted for the obtained active material precursor ($La_{1.2}Sr_{1.8}Mn_2O_7F_2$) three times in total.

An electrode active material was obtained in the above procedure.

Production of Battery

A battery was produced by using the obtained electrode active material as the cathode active material. The cathode active material, $La_{0.9}Ba_{0.1}F_{2.9}$ which was a fluoride ion conductive material, and VGCF which was an electron conductive material, were mixed and pellet molded to obtain an electrode pellet (1 cm²). A pellet battery comprising the obtained electrode pellet (working electrode), a solid electrolyte layer using $La_{0.9}Ba_{0.1}F_{2.9}$, $Pb_{0.6}Sn_{0.4}F_2$, acetylene black (AB), and a Pb foil (counter electrode), was produced by pressing thereof.

Comparative Example

To $La_{1.2}Sr_{1.8}Mn_2O_2$, a fluorination treatment using PVDF (polyvinylidene fluoride) was conducted. The conditions for the fluorination treatment were the same as those in Example except that 300° C. was kept for 12 hours. Also, in Comparative Example, the fluorination treatment was conducted just once. Thereby, an active material precursor ($La_{1.2}Sr_{1.8}Mn_2O_7F_2$) was obtained.

Also, a battery was produced in the same manner as in Example except that the obtained active material precursor was used as the cathode active material.

[Evaluation]
Charge and Discharge Test

A charge and discharge test for the battery obtained in Example was conducted in a cell heated to 150° C., and the discharge capacity was measured. The condition for the charge and discharge test was constant current charge and discharge of 0.1 mA, −1.5 V to 3.0 V (vs. Pb/PbF$_2$). Also, regarding the battery obtained in Example, the discharge capacity when the current value in the above described charge and discharge test was 0.15 mA and 0.2 mA was respectively measured.

In the same manner, a charge and discharge test was conducted for the battery obtained in Comparative Example, and the discharge capacity was measured. The condition for the charge and discharge test was the same as that in Example except that the current value in the charge and discharge test was changed to 0.1 mA and 0.2 mA. The result is shown in FIG. 5.

Figure 5:
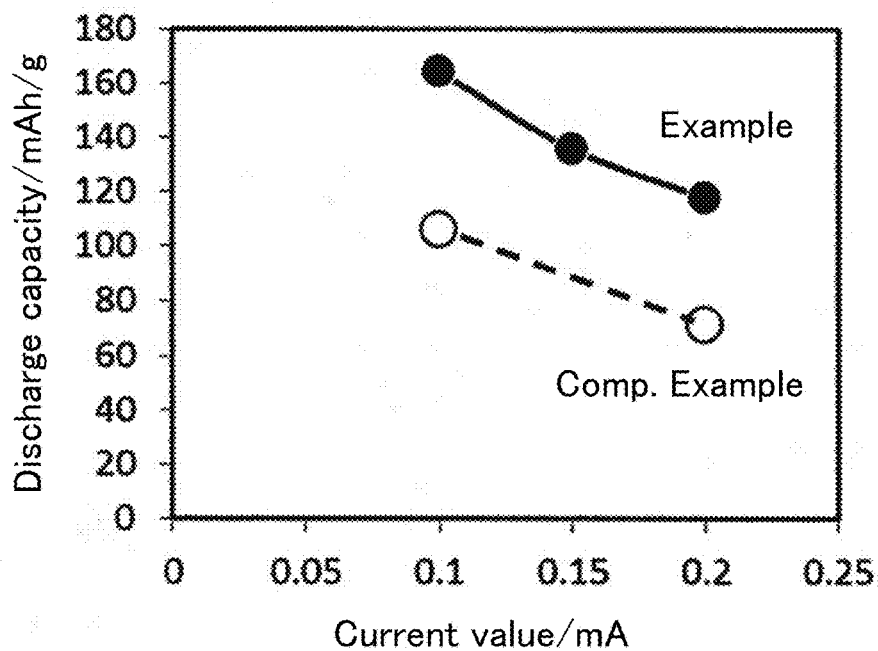
FIG. 5 is a graph showing the discharge capacity of the batteries in Example and Comparative Example.

As shown in FIG. 5, it was confirmed that the discharge capacity in Example was more excellent than that in Comparative Example. Also, it was confirmed that the discharge capacity was improved even when the current value was 0.2 mA, which was a high rate, in Example.

Next, the cycle properties were evaluated. In the evaluation of the cycle properties, a capacity maintenance rate in each cycle was calculated. The capacity maintenance rate was calculated as the rate of the capacity after each cycle with respect to the initial capacity. The result is shown in FIG. 6.

Figure 6:
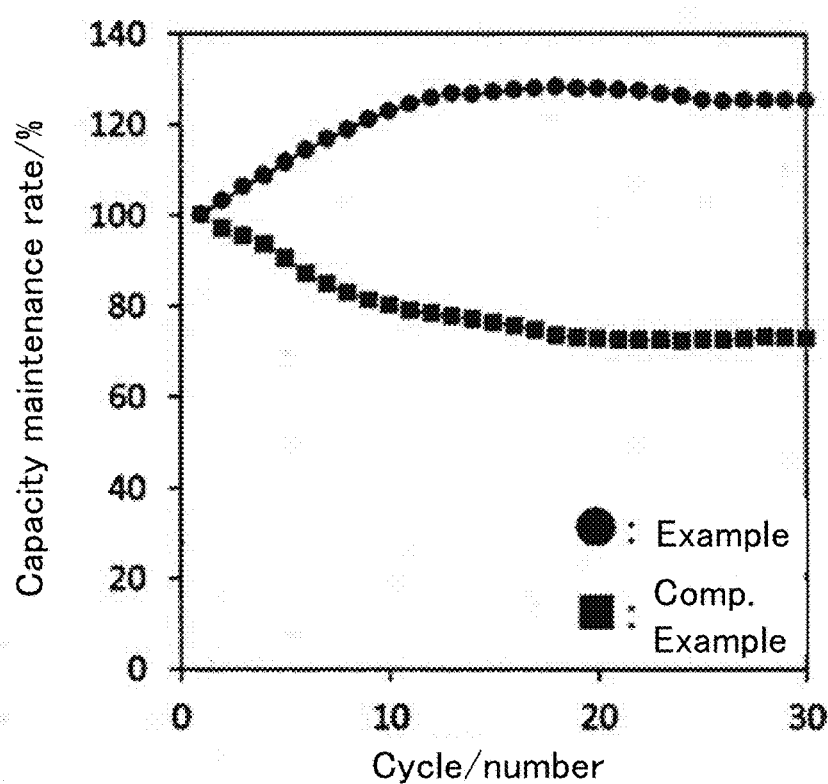
FIG. 6 is a graph showing the cycle properties of the batteries in Example and Comparative Example.

As shown in FIG. 6, in Example, it was confirmed that the capacity maintenance rate was improved until approximately 15 cycles. The reason therefor was presumed that, in the current evaluation, the charge was conducted to 3.0 V (vs. Pb/PbF$_2$), so that the redox of oxygen was utilized. In this charge region, it was presumed that the activation of the active material gradually proceeded, and thus the capacity was improved from the initial time to approximately 15 cycles.

Also, in Example, decrease in the capacity maintenance rate was not confirmed until 30 cycles.

On the other hand, in Comparative Example, it was confirmed that decrease in the capacity maintenance rate occurred from the initial time to approximately 20 cycles. Also, in Comparative Example, the tendency of the capacity improvement was not confirmed unlike in Example. The reason therefor was presumed that the charge and discharge was completed without the occurrence of the capacity improvement since the resistance was high in Comparative Example.

In Example, it was confirmed that decrease in the capacity maintenance rate was remarkably inhibited, compared to Comparative Example.

HAADF-STEM Measurement

HAADF-STEM measurement was conducted for the electrode active material obtained in Example, and for the active material precursor obtained in Comparative Example. The results are shown in FIGS. 7A to 7G and FIG. 8.

Figure 7A:
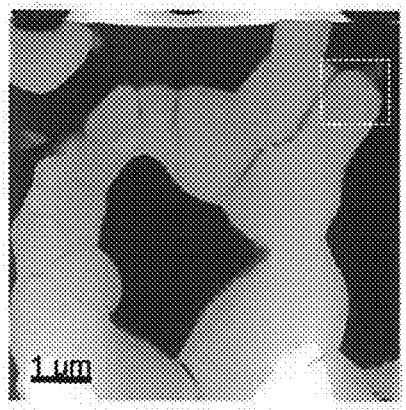
Figure 7B:
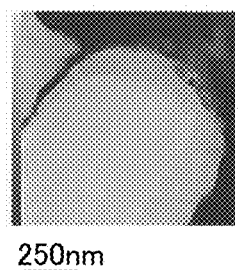
Figure 7C:
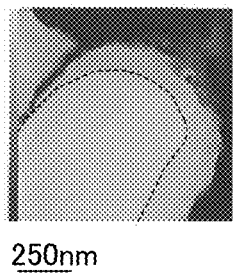

As shown in FIGS. 7A to 7C, in the electrode active material in Example, the regions with different contrasts were confirmed on the surface of the particle. Incidentally, FIGS. 7B and 7C are the observation images of the region surrounded by a broken line in FIG. 7A in a high magnification rate. Also, in FIG. 7C, for the explanatory reason, the border of the regions in FIG. 7B is shown as a broken line.

Figure 8:
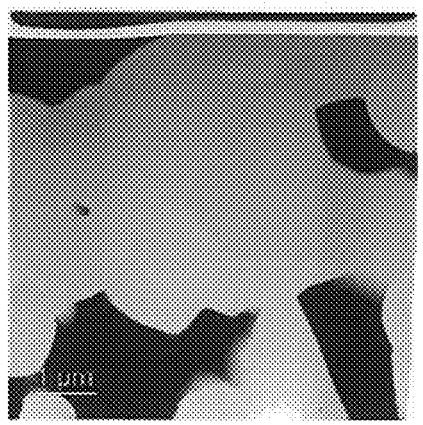
FIG. 8 is the result of HAADF-STEM measurement for the electrode active material in Comparative Example.

On the other hand, as shown in FIG. 8, in the electrode active material in Comparative Example, the regions with different contrasts were not confirmed.

From these results, it was confirmed that the coating region was obtained in Example, but the coating region was not obtained in Comparative Example.

Figure 7E:
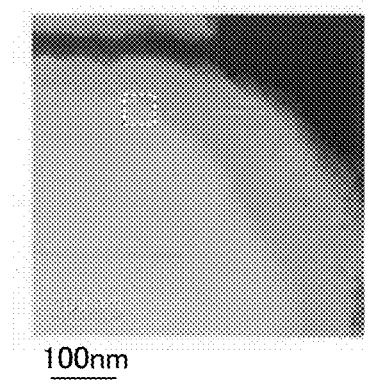
Figure 7F:
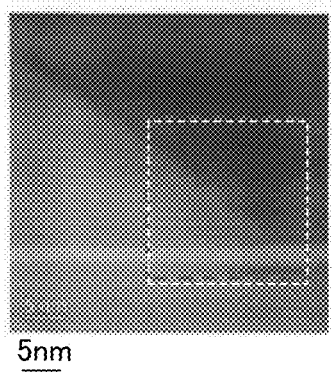
Figure 7G:
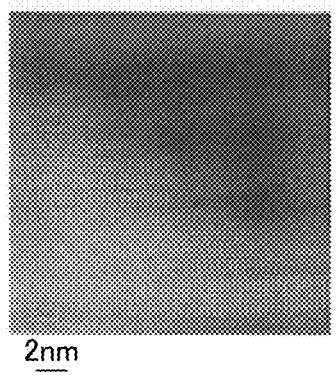

Also, as shown in FIGS. 7E to 7G, when the region of the electrode active material which corresponds to the border between the two regions with different contrasts was observed in a higher magnification rate (50 magnifications), the two regions did not have a clear border, and thus it was confirmed that the coating region and the active material region were continuous.

Figure 9A:
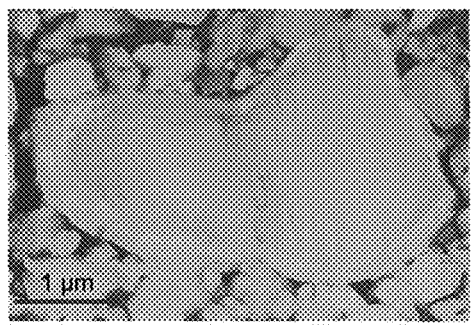
FIGS. 9A and 9B are the results of HAADF-STEM measurement for the electrode active material in Example after a cycle test.
Figure 9B:
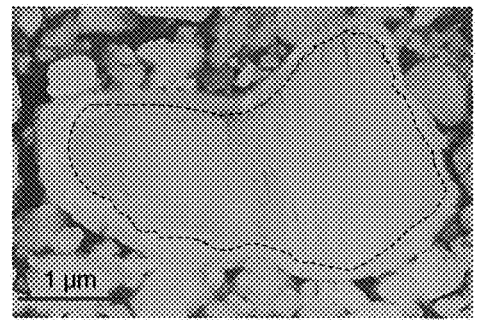

Also, HAADF-STEM measurement was conducted for the electrode active material in Example after the above described charge and discharge cycle. The results are shown in FIGS. 9A and 9B. As shown in FIGS. 9A and 9B, in the electrode active material in Example, it was confirmed that the coating region on the surface was remained after the charge and discharge cycle. Incidentally, in FIG. 9B, for the explanatory reason, the border of the regions in FIG. 9A is shown as a broken line. Inclusion of the coating region presumably inhibited the capacity degrade due to the crack and structural collapse peculiar to a layered active material.

TEM-EDX Measurement

TEM-EDX measurement was conducted for the electrode active material in Example. The observation images of TEM-EDX are shown in FIGS. 10A to 10F. FIGS. 10B to 10F respectively shows the concentration distribution of La elements, O elements, F elements, Mn elements, and Sr elements in the electrode active material in HAAD-STEM image shown in FIG. 10A; more elements are distributed in the lighter colored region than in the darker colored region. Incidentally, for the explanatory reason, in FIG. 10D and FIG. 10F, the borders of the regions in FIG. 10C and FIG. 10D is respectively shown as a broken line.

Figure 11A:
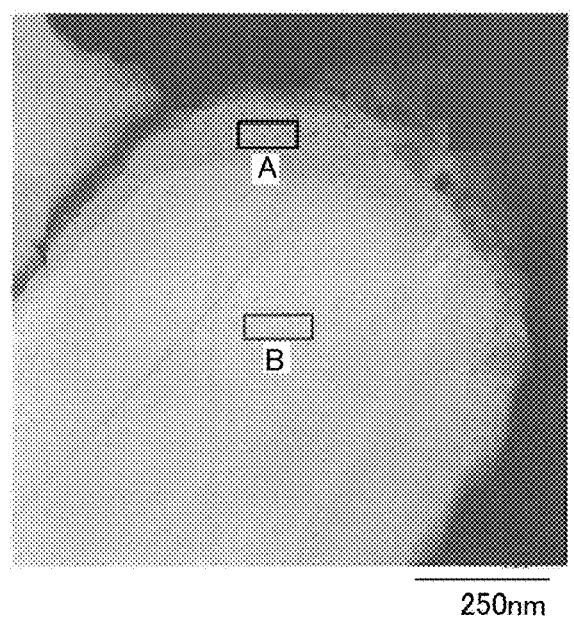
FIGS. 11A to 11C are the results of TEM-EDX measurement for the electrode active material in Example.
Figure 11B:
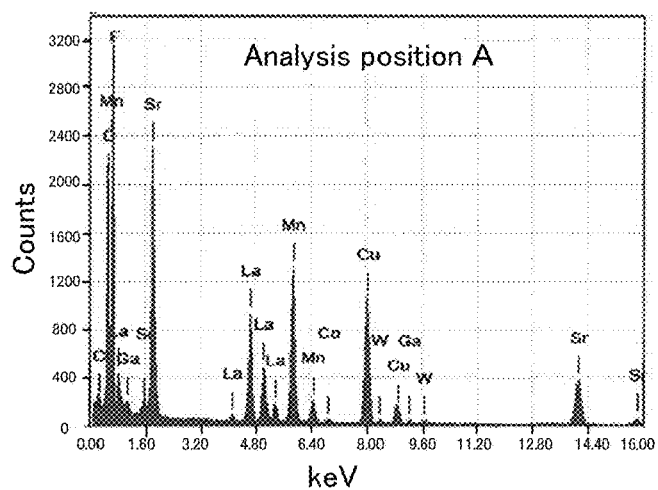
Figure 11C:
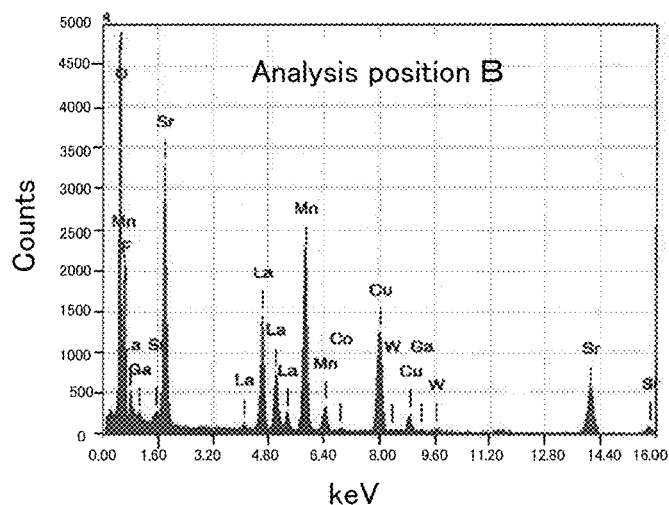

Also, the concentration (atomic %) of O elements, F elements, Mn elements, Sr elements, and La elements at position A and position B shown in FIG. 11A was respectively measured. The EDX spectrum is shown in FIGS. 11B and 11C. Also, the measured values are shown in Table 1. Incidentally, the peaks of Cu, W, Co, and Ga seen in the EDX spectrum were respectively noises from a mesh made of Cu, a W protective layer, a pole piece, and an FIB ion source, those used upon the measurement for the sample.

From the results of the concentration of each element at A and B in Table 1, as the composition formula when the composition of Mn was set to be 2, position A had the composition represented by the composition formula $La_{1.3}Sr_{1.7}Mn_2O_{3.6}F_{4.7}$, and position B had the composition represented by the composition formula $La_{1.4}Sr_{1.6}Mn_2O_{6.1}F_{1.5}$.

TABLE 1

| Analysis position | O element (O—K) (atomic %) | F element (F—K) (atomic %) | Mn Element (Mn—K) (atomic %) | Sr element (Sr—K) (atomic %) | La element (La—L) (atomic %) |
|---|---|---|---|---|---|
| A | 27.0 | 35.0 | 15.0 | 12.9 | 10.1 |
| B | 48.3 | 12.1 | 15.8 | 12.7 | 11.1 |
| A/B | 0.6 | 2.9 | 0.9 | 1.0 | 0.9 |

From the results in FIGS. 10A to 10H, FIGS. 11A to 11C, and Table 1, it was confirmed that the fluorine concentration in the coating region was higher (fluorine elements concentrated more) than that in the active material region, in Example. Also, from the results in FIGS. 10A to 10H, FIGS. 11A to 11C, and Table 1, it was confirmed that the oxygen concentration was lower in the coating region than that in the active material region, in Example.

Electron Beam Diffraction Measurement

Figure 12A:
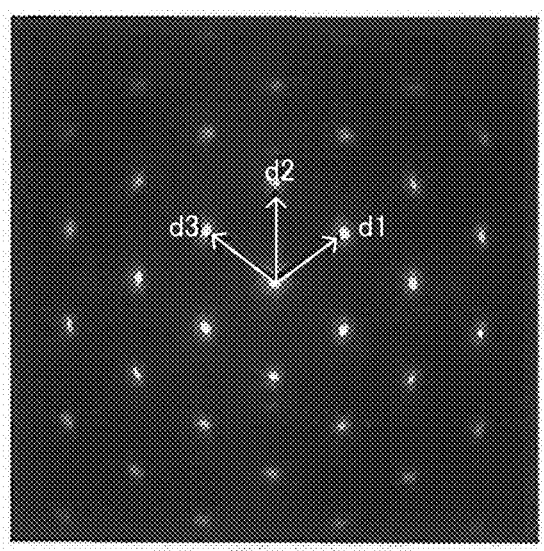
FIGS. 12A and 12B are the results of an electron beam diffraction measurement in Example.
Figure 12B:
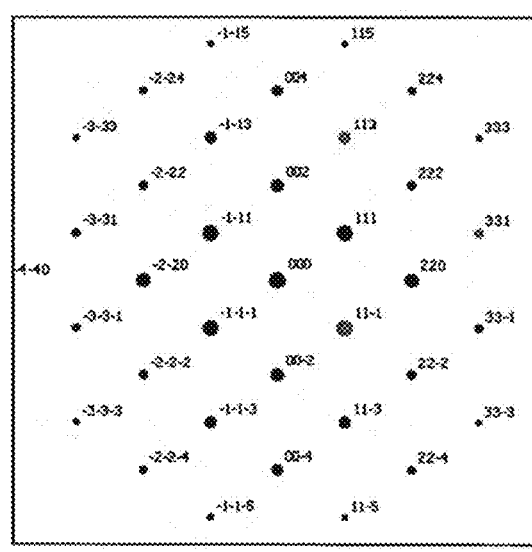

An electron beam diffraction measurement was conducted for the coating region of the electrode active material in Example. The result is shown in FIG. 12A. Also, the simulation result of $SrF_2$, which has a fluorite structure, is shown in FIG. 12B. Also, measured length of d1, d2, and d3 in FIG. 12A, and the values of $d_{111}$, $d_{002}$, and $d_{-1-11}$ of $SrF_2$ in FIG. 12B are shown in Table 2.

TABLE 2

| Coated region in Example (nm) | | $SrF_2$ (nm) | |
|---|---|---|---|
| d1 | 0.339 | $d_{111}$ | 0.335 |
| d2 | 0.292 | $d_{002}$ | 0.290 |
| d3 | 0.337 | $d_{-1-11}$ | 0.335 |

From the results in FIGS. 12A and 12B, it was confirmed that the coating region positioned in the surface side of the particle in Example showed the electron beam diffraction image belonging to a fluorite structure. Also, it was suggested that the coating region had ion conductivity.

REFERENCE SIGNS LIST 1 electrode active material
1a active material region
1b coating region
1c active material precursor
20 all solid fluoride ion battery
21 cathode active material layer
22 anode active material layer
23 electrolyte layer
24 cathode current collector
25 anode current collector
26 battery case

What is claimed is:

1. An all solid fluoride ion battery comprising: a cathode active material layer containing a cathode active material, an anode active material layer containing an anode active material, and a solid electrolyte layer formed between the cathode active material layer and the anode active material layer; wherein
the cathode active material or the anode active material is an electrode active material comprising:
an active material region that contains an active material component including a layered structure; and
a coating region positioned in a surface side of the active material region;
the electrode active material functions as an active material by intercalation and desorption of fluoride ions;
the active material component includes a layered Perovskite structure and a crystal phase represented by $A_{n+1}B_nO_{3n+1-\alpha}F_x$, in which A includes at least one selected from the group consisting of an alkali earth metal element and a rare earth element, B includes at least one selected from the group consisting of Mn, Co, Ti, Cr, Fe, Cu, Zn, V, Ni, Zr, Nb, Mo, Ru, Pd, W, Re, Bi, and Sb, n is 1 or 2, $\alpha$ satisfies $0 \leq \alpha \leq 2$, and x satisfies $0 \leq x \leq 2.2$, and
wherein a fluorine concentration (atomic %) in the active material region is regarded as F1, and wherein a fluorine concentration (atomic %) in the coating region is regarded as F2, such that a fluorinating ratio F2/F1 is 1.5 or higher.

2. The all sold fluoride ion battery according to claim 1, wherein A includes at least one selected from the group consisting of Ca, Sr, Ba, Sc, Y, La, Ce, Pr, Nd, Sm, and Gd.

3. The all solid fluoride ion battery according to claim 1, wherein A includes at least one selected from the group consisting of Sr and La, and
B includes at least Mn.

4. The all solid fluoride ion battery according to claim 1, wherein the fluorinating ratio F2/F1 is 2.5 or more.

5. The all solid fluoride ion battery according to claim 1, wherein the fluorinating ratio F2/F1 is from 1.5 to 4.

6. The all solid fluoride ion battery according to claim 1, wherein the fluorinating ratio F2/F1 is from 1.5 to 3.

7. The all solid fluoride ion battery according to claim 1, wherein the fluorinating ratio F2/F1 is from 2.5 to 4.

8. The all solid fluoride ion battery according to claim 1, wherein the fluorine content in the coating region is 25 atomic % or higher.

9. The all solid fluoride ion battery according to claim 1, wherein the fluorine content in the coating region is 30 atomic % or higher.

10. The all solid fluoride ion battery according to claim 1, wherein the fluorine content in the coating region is 40 atomic % or lower.

11. The all solid fluoride ion battery according to claim 1, wherein the fluorine content in the coating region is 35 atomic % or lower.

12. The all solid fluoride ion battery according to claim 1, wherein the fluorine content in the coating region is 25 atomic % to 40 atomic %.

13. A method for producing the all solid fluoride ion battery according to claim 1, the method comprising:
a fluorination treatment step in which an active material precursor including a layered structure is prepared, and the active material precursor is subjected to a fluorination treatment to form the active material region and the coating region.

* * * * *